United States Patent [19]
Bennett

[11] Patent Number: 5,539,518
[45] Date of Patent: Jul. 23, 1996

[54] METHOD FOR DETERMINING AND DISPLAYING THE SPACIAL DISTRIBUTION OF A SPECTRAL PATTERN OF RECEIVED LIGHT

[75] Inventor: Charles L. Bennett, Livermore, Calif.

[73] Assignee: The United States of America as represented by the United States Department of Energy, Washington, D.C.

[21] Appl. No.: 487,713

[22] Filed: Jun. 6, 1995

Related U.S. Application Data

[63] Continuation of Ser. No. 119,857, Sep. 13, 1993, abandoned.
[51] Int. Cl.⁶ .................................................. G01B 9/02
[52] U.S. Cl. .......................................... 356/346; 356/345
[58] Field of Search .................................... 356/346, 345

[56] References Cited

U.S. PATENT DOCUMENTS

| 3,702,735 | 5/1971 | Potter | 356/346 |
|---|---|---|---|
| 4,086,652 | 4/1978 | Mantz | 356/346 |
| 4,523,846 | 6/1985 | Breckinridge et al. | 356/346 |
| 4,684,255 | 8/1987 | Ford | 356/346 |
| 4,799,001 | 1/1989 | Burch | 356/346 |
| 5,094,535 | 3/1992 | Dahlquist et al. | 356/346 |
| 5,166,749 | 11/1992 | Curbelo et al. | 356/346 |

OTHER PUBLICATIONS

Beer, Reinhard, Remote Sensing by Fourier Transform Spectrometry, May 28, 1992, pp. 1–29, *Chemical Analysis* vol. 120.

Primary Examiner—Frank Gonzalez
Assistant Examiner—Robert Kim
Attorney, Agent, or Firm—Miguel A. Valdes; William C. Daubenspeck; William R. Moser

[57] ABSTRACT

An imaging Fourier transform spectrometer (10, 210) having a Fourier transform infrared spectrometer (12) providing a series of images (40) to a focal plane array camera (38). The focal plane array camera (38) is clocked to a multiple of zero crossing occurrences as caused by a moving mirror (18) of the Fourier transform infrared spectrometer (12) and as detected by a laser detector (50) such that the frame capture rate of the focal plane array camera (38) corresponds to a multiple of the zero crossing rate of the Fourier transform infrared spectrometer (12). The images (40) are transmitted to a computer (45) for processing such that representations of the images (40) as viewed in the light of an arbitrary spectral "fingerprint" pattern can be displayed on a monitor (60) or otherwise stored and manipulated by the computer (45).

1 Claim, 2 Drawing Sheets

METHOD FOR DETERMINING AND DISPLAYING THE SPACIAL DISTRIBUTION OF A SPECTRAL PATTERN OF RECEIVED LIGHT

The United States Government has rights in this invention pursuant to Contract No. W-7405-ENG-48 between the United States Department of Energy and the University of California.

This is a continuation of application Ser. No. 08/119,857 filed Sep. 13, 1993 now abandoned.

BACKGROUND OF THE INVENTION

The present invention relates generally to optical spectrum analysis means and more specifically to an improved imaging spectrometer using Fourier transform methods.

An imaging spectrometer acquires what is referred to as a "data cube" having two spatial and one spectral dimensions. There exist in the prior art a variety of means to this end, the applicability of each being dependent, at least in part, upon whether spectra are dispersed in zero, one, or two dimensions. Any non-imaging spectrometer may have its field of view rastered across a scene to produce a data cube, but this is a very tedious and inefficient method. The introduction of focal plane image detectors has enabled more efficient acquisition of spectrally and spatially resolved data.

Most directly, a combination of an imaging detector with a succession of filters passing various bands can also produce a data cube. Alternatively an imaging grating spectrometer disperses light in one spatial dimension, and provides imaging in an orthogonal direction. By concatenation of a succession of one dimensional slices of a scene, a two dimensional image may be reconstructed. In addition to those specifically discussed herein, there exist in the art a variety of additional methods for imaging the output of a dispersive spectrometer to produce a data cube. An imaging spectrometer base on a Fizean interferometer also exists in the prior art, which spectrometer is based on the Fourier transform of a spatially encoded interferogram in one dimension, with the orthogonal dimension providing a one dimensional spatial image. As with imaging grating spectrometers, the imaging Fizean spectrometer builds up the second spatial dimension of a data cube by concatenation of a succession of one dimensional slices. Fourier transform spectrometers have become a preferred means for measuring spectra in a variety of applications. A book entitled *Remote Sensing by Fourier Transform Spectrometry*, written by Reinhard Beer and published in 1992 by John Wiley and Sons, Inc., details much of the known state of the art in this science (particularly as the science is applied to the field of atmospheric spectrometry). The first two chapters of the above referenced work are relevant to the present invention. Chapter one addresses the basic principles of Fourier Transform Spectrometry and Chapter Two addresses the characteristics of an "ideal" Fourier transform spectrometer. Briefly, a Fourier transform spectrometer is an adaption of a conventional Michelson interferometer which produces an indication of spectra (an "interferogram") the Fourier transform of which yields the spectrum. A well known technique known as fast Fourier transform ("FFT") is generally employed as the most expedient means to this end. An imaging Fourier transform spectrometer can be produced by recording multiple images at the detector focal plane of a conventional Fourier transform spectrometer, instead of the single point measurements of current instruments. A detector array is employed to detect the series of images. The variation of light intensity observed at any given pixel then constitutes the interferogram for that pixel, and the Fourier transform algorithm then yields the corresponding spectrum for that pixel.

Although a variety of imaging spectrometer systems exist in the prior art, to the inventor's knowledge none has had throughput capabilities sufficient such that it is possible to produce a real time display of a scene as viewed with a digital filter, thus using the digital filter to produce a spectral "fingerprint" for selective imaging of just those areas in the field of view which correspond to material possessing the specified spectral signature. To the inventor's knowledge, no means has previously accomplished the real time acquisition and display of high spectral resolution imaged data.

SUMMARY OF THE INVENTION

Accordingly, it is an object of the present invention to provide a Fourier transform interferometer for which a spectrum can be determined for each pixel of a detector.

It is another object of the present invention to provide an imaging spectrometer which will detect a broad spectral range.

It is still another object of the present invention to provide a spectrometer which will allow the user to observe a two dimensional visual representation of a spectral band, or any desired spectral pattern, in near real time.

It is yet another object of the present invention to provide a means for efficiently and rapidly acquiring a data cube from a Fourier transform spectrometer.

Briefly, the present invention is an imaging Fourier transform spectrometer employing an interferometer coupled to a digital framing camera. Output from the digital framing camera is provided to a computer which, by manipulation of that data can display a two dimensional representation of measured spectra and/or numerical data pertaining to that spectra, as required. The digital framing camera is optically and electrically coupled to the output of the interferometer such that an interferogram is recorded at precise intervals in synchrony with the movement of the moving mirror of the interferometer. A first preferred embodiment of the imaging resolved Fourier transform spectrometer is adapted for microscopic analysis. An equally preferred alternate embodiment of the invention is adapted for observation of macroscopic objects.

An advantage of the present invention is that the entire field of view of a Fourier transform spectrometer is recorded generally simultaneously.

A further advantage of the present invention is that there is a very uniform response from pixel to pixel within the field of view.

Yet another advantage of the present invention is that arbitrary spectral patterns or "fingerprints" can be analyzed and displayed visually in near real time or can be stored for subsequent analysis.

Still another advantage of the present invention is that a large number of data points enable high spectral resolution to be derived from the interferograms.

Yet another advantage of the present invention is that the etendue of the imaging Fourier transfer spectrometer may be much larger than for a conventional Fourier transform spectrometer.

These and other objects and advantages of the present invention will become clear to those skilled in the art in view of the description of the best presently known mode of carrying out the invention and the industrial applicability of the preferred embodiment, as described herein and as illustrated in the several figures of the drawing.

DETAILED DESCRIPTION OF THE INVENTION

The best presently known mode for carrying out the invention is an imaging Fourier transform spectrometer. The predominant expected usage of the imaging Fourier transform spectrometer is in the empirical analysis of objects for purposes of scientific research and like endeavors.

Figure 1:
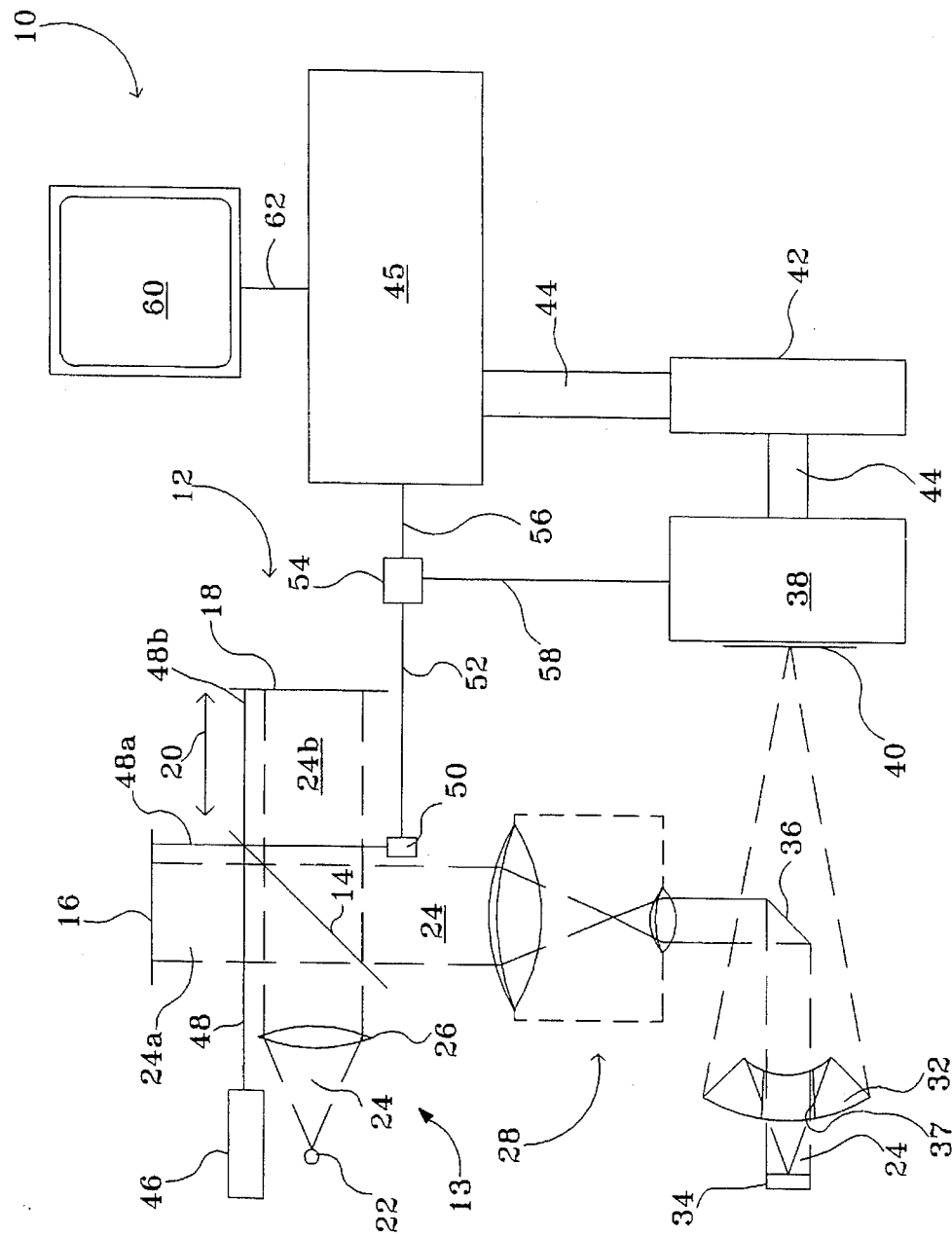
FIG. 1 is a schematic diagram of an imaging Fourier transform spectrometer for microscopic analysis according to the present invention.

An imaging Fourier transform spectrometer is shown in the schematic diagram of FIG. 1 and is designated therein by the general reference character 10. In many respects the imaging Fourier transform spectrometer is not unlike prior art conventional Fourier transform spectrometers. Conventional elements of the imaging Fourier transform spectrometer 10 include a conventional Fourier transform infrared ("FTIR") spectrometer 12 with a conventional interferometer 13 therein. In the best presently known embodiment 10 of the present invention the FTIR spectrometer 12 is a Bio-Rad model FTS 60A, although similar spectrometers could be employed for the purpose. The interferometer 13 of the FTIR spectrometer 12 includes a beam splitter 14, a fixed mirror 16 and a moving mirror 18. The moving mirror moves linearly as indicated by a moving mirror movement arrow 20.

A point light source 22 projects a light beam 24 through a collimating lens 26 onto the beam splitter 14. One skilled in the art will recognize that a true point light source does not exist. Rather the point light source 22 of the best presently known embodiment 10 of the present invention approximates a true point light source. In the best presently known embodiment 10 of the present invention, the collimating lens 26 is a reflective lens, although a refractive lens could also be used for the purpose. The collimating lens 26 is positioned at its focal length from the point light source 22.

As one familiar with the operation of a conventional FTIR spectrometer will recognize, the light beam 24 from the point light source 22 is divided by the beam splitter 14 such that a first portion 24a of the light beam 24 is reflected from the fixed mirror 16 and an additional portion 24b is reflected from the moving mirror 18. The recombined light beam 24 is then directed into a condensing lens system 28, and then through a focusing lens 32 and onto an object 34, the object 34 being the object which is to be examined by the imaging Fourier transform spectrometer 10. In the best presently known embodiment 10 of the present invention, a turning reflector 36 is interposed between the second collimating lens 28 and the focusing lens 32 to redirect the light beam 24 through an aperture 37 in the focusing lens 32. As shown in the example of FIG. 1, the condensing lens system 28 has refractive optical elements, although one skilled in the art will recognize that reflective elements could be used as well. Furthermore, while the focusing lens 32 of the best presently known embodiment 10 of the present invention, as depicted in the example of FIG. 1, is a Cassegrainian type lens, one skilled in the art will recognize that other configurations, such as Newtonian lens system, could be readily adapted to the purpose.

The light beam 24, having been reflected from the object 34 is focused by the focusing lens 32 onto a focal plane array camera ("camera") 38. An image 40 (represented by a line in the drawing of FIG. 1) formed at the camera 38 is converted to a digital data stream and transmitted to a local memory 42 via a fast bus 44. The local memory 42 is also connected to a computer 45 by the fast data bus 44. The local memory 42 is sufficiently large to store all of the iterations of the image 40 corresponding to a complete range of travel of the moving mirror 18 in the Fourier transform infrared spectrometer 12.

As can be seen in the view of FIG. 1, a laser 46 directs a laser beam 48 toward the beam splitter 14 of the FTIR spectrometer 12. The laser beam 48, like the previously described light beam 24 is divided by the beam splitter 14 into a first laser beam portion 48a and a second laser beam portion 48b which portions are reflected from the fixed mirror 16 and from the moving mirror 18, respectively, and recombined at the beam splitter 14. The recombined laser beam 48 is then directed toward a laser detector 50. One skilled in the art will recognize that the laser detector 50 provides an accurate means for measuring the movement of the moving mirror 18. A sine wave signal (not shown) is produced internally in the laser detector 50 and, of particular interest regarding the present invention, also a zero crossing signal (represented in the view of FIG. 1 by a zero crossing signal line 52—that being the conductor upon which such zero crossing signal is carried). A zero crossing pulse is emitted on the zero crossing signal line 52 when the optical paths of the first laser beam portion 48a and the second laser beam portion 48b differ by a multiple of the half wavelength of the laser beam 48. A frequency multiplier 54 multiplies the signal on the zero crossing signal line 52 by a factor "N". In the best presently known embodiment be of the invention, the frequency multiplier is programmable such that the computer 45 can select and control the value of "N" as indicated in the view of FIG. 1 via a frequency multiplier control line 56 interconnecting the frequency multiplier 54 and the computer 45. As one familiar with the operation and characteristics of Fourier transform spectrometers will recognize, it is critical that the formation and recordal of the intensity of light at the focal plane (or successive iterations of the image 40 in the case of the best presently known embodiment 10 of the present invention) be precisely coordinated with the position of the moving mirror 18. Therefore, in the best presently known embodiment 10 of the present invention, the focal plane array camera 38 is slaved to the frequency multiplier 54 via a camera clock line 58 such that the focal plane array camera 38 captures the image 40 and transmits it to the local memory 42 at a rate precisely synchronized to the rate of the zero crossing points detected by the laser detector 50 as indicated by the presence of a zero crossing pulse on the zero crossing signal line 52. In order to accomplish this the frequency multiplier 54 is controlled via the computer 45 to cause a clock signal to the camera clock line 58 which is a function of the number of pixels of the focal plane array camera 38 such that for each zero crossing signal appearing on the zero crossing signal line 52 the focal plane array camera 38 will record a precise fraction or multiple of the image 40. For example if the focal plane array camera 38 has a 128 by 128 pixel array, the frequency multiplier will have an output 128×128=16,384 times the frequency of the zero crossing signal pulse appearing on the zero crossing signal line in order to have exactly one frame per zero crossing. (Note that, as one skilled in the art will recognize, some camera configurations require additional clock pulses to denote the end of line registers, or the like. A skilled artisan can easily select the proper factor "N" according to the number of pixels of the focal plane array camera 38 and any other variables which might be peculiar to the particular camera used or any other relevant variables.

Figure 2:
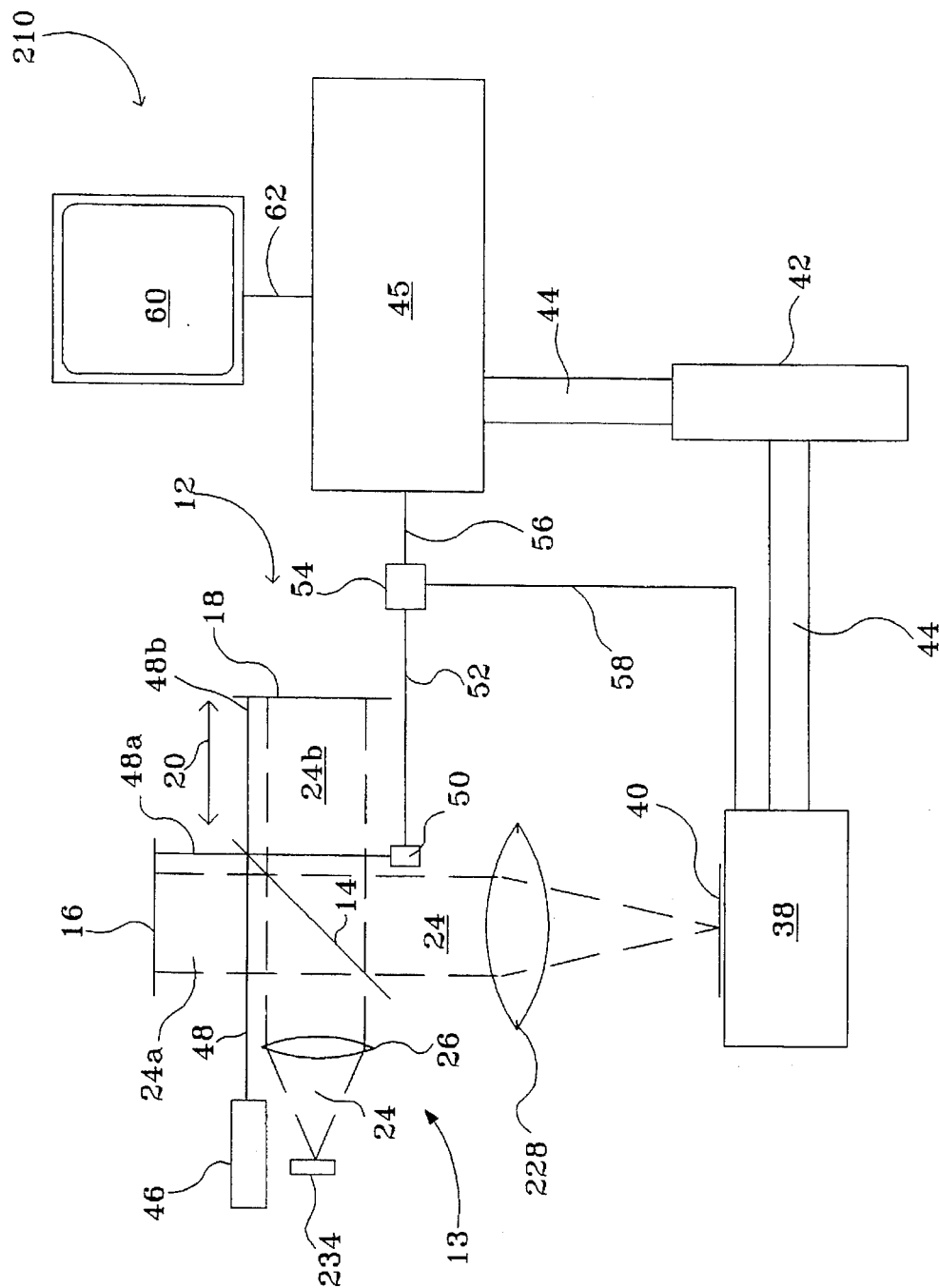
FIG. 2 is a schematic diagram of the imaging Fourier transform spectrometer for macroscopic analysis according to the present invention.

FIG. 2 is a schematic diagram of an equally preferred alternate embodiment 210 of the present invention. The equally preferred alternate embodiment 210 of the present invention is adapted for observation and analysis of macroscopic examples of an object 234. For such an object 234 for which great magnification is not required, the object 234 can be placed in the focal plane of the initial collimating lens 26 and the self emission of the object 234 or ambient light reflected from the object 234 is focussed through the Fourier transform infrared spectrometer 12 by a condensing lens 228 onto the focal plane array camera 38. As can be observed by a comparison of the diagram of FIG. 1 to that of FIG. 2, the equally preferred alternate embodiment 210 of the present invention differs significantly from the first preferred embodiment 10 primarily in the means for focusing the image 40 onto the focal plane array camera 38. Those components not specifically differentiated herein are common to the best presently known embodiment 10 and the equally preferred alternate embodiment 210 of the present invention.

Various modifications may be made to the invention without altering its value or scope. One skilled in the art could readily adapt the present invention for use with various spectral regions and variations in the object 34, 234 under study. For example, for remote sensing applications it would be possible to omit the entrance lens (the collimating lens 26) entirely, or to replace it with an afocal telescope. Yet another modification would be to replace the specific focal plane array camera 38 discussed herein as being used in the best presently known embodiment 10 of the present invention with one more specifically adapted for a particular spectral range. Indeed, the inventor has successfully applied the present invention for specific application to the infrared range by substituting an infrared camera for the specific focal plane array camera 38 discussed herein.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The imaging Fourier transform spectrometers 10, 210 of the present invention are designed for use as instruments for measuring emitted and reflected spectra in a wide variety of forensic, medical and scientific applications.

As described above, multiple iterations of the image 40 can be rapidly recorded such that, for most practical purposes (that is for examples of the object 34 which are not in rapid movement and which are not themselves varying rapidly over time), a complete data cube is created within seconds. One skilled in the art will recognize that the images 40 discussed herein are essentially pictorial images as one might obtain by directly recording the reflection of the objects 34, 234 with the focal plane array camera 38. The images 40 are only slightly modulated by the interferometer except very near the zero phase point where the two mirrors in the interferometer are equidistant from the beam splitter. A series of iterations of the image 40, each of which is associated with a particular position of the moving mirror 18 in the Fourier transform infrared spectrometer is captured in the local memory 42 and transferred to the computer 45 where a discrete Fourier transformation of the intensity of the signal of any given pixel of the focal plane array camera 38 is performed as a function of time. This transformed data is then proportional to the spectrum of the light corresponding to that given pixel. It is possible with an available high speed computer 45 to keep up with the data stream from the focal plane array camera 38 and perform the Fourier transforms as fast as the data is acquired. Furthermore, it requires very little extra computation to display combinations of spectral features which correspond to particular chemical compounds or molecular forms. Thus, the computer 45 sends data to the display monitor 60 which enables real time display corresponding to particular spectral fingerprints. For example, if the spectral fingerprint corresponding to carbon monoxide gas is used as a pattern to be matched, the image in the display could be caused to correspond to the intensity of emission from carbon monoxide. (Note that ordinary carbon monoxide is a colorless, odorless, invisible gas.)

It is critical to the present invention to have very precise control over the exposure time of each frame (iteration of the image 40) recorded by the focal plane array camera 38. Therefore, the unique method of relating the movement of the moving mirror 18 to the focal plane array camera 38 described herein is an important aspect of the present invention.

In operation of the inventive imaging Fourier transform spectrometers 10, 210 the computer 45 allows for command and control of variables such as the frame rate, the scanning distance of the moving mirror 18, and form of display of the data on the monitor 60. As previously discussed, the computer 45 also performs the required Fourier transforms by means of a Fast Fourier Transform ("FFT") technique, without which operation or equivalent thereof the "real time" aspect of the present invention would not be possible.

The spectrally resolved Fourier transform interferometers 10, 210 may be adapted for utilization in essentially any application wherein conventional prior art spectrometers, and particularly imaging spectrometers, are used. Therefore, it is expected that the inventive method and means will be acceptable in the field as a substitute for the conventional spectrometers. For these and other reasons, it is expected that the utility and industrial applicability of the invention will be both significant in scope and long-lasting in duration.

I claim:

1. A method for determining and displaying the spacial distribution of a selected spectral pattern received light comprising the steps of:

collimating said received light;

passing said collimated light through an interferometer having a moving mirror;

focusing the light that has passed through said interferometer as an image onto a focal plane array of pixels of a digital framing camera;

repetitively sampling an intensity of said image in said digital framing camera to provide digital frames of the intensity of said image as a function of the position of the moving mirror;

storing said digital frames of the intensity of said image in a memory;

coupling the stored digital frames of the intensity of said image to a computer;

calculating in said computer a Fourier transform of each of said stored digital frames of the intensity of said image to provide spectra for every pixel in said array;

filtering said spectra for the selected spectral pattern in said spectra for every pixel in said array to provide an image of said spectral pattern across said array; and displaying said image of said spectral pattern on a video monitor to provide the spacial distribution of said spectral pattern.

* * * * *